J. S. EVANS.
FISHING HOOK.
APPLICATION FILED NOV. 23, 1914.
1,158,666.
Patented Nov. 2, 1915.
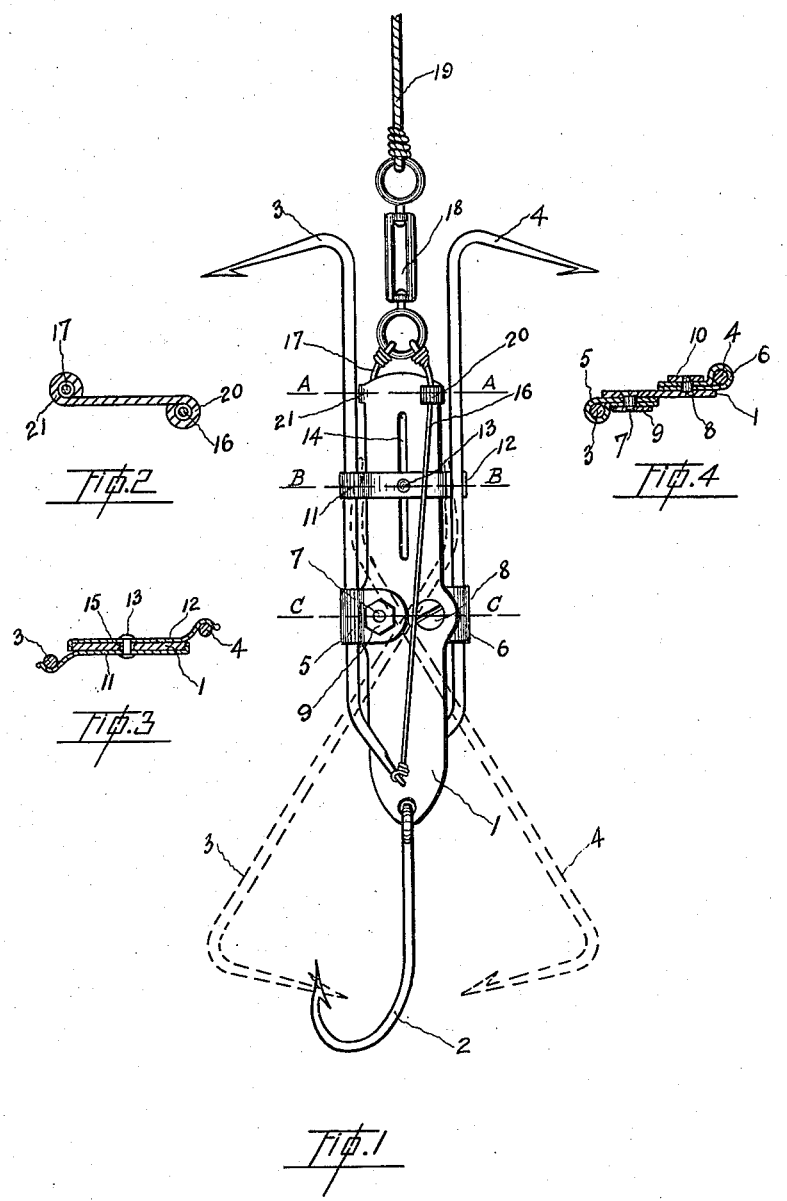
WITNESSES.
P. Hill.
C. J. Collins.
INVENTOR.
JOHN SPENCER EVANS.

UNITED STATES PATENT OFFICE.

JOHN SPENCER EVANS, OF VANCOUVER, BRITISH COLUMBIA, CANADA, ASSIGNOR OF ONE-HALF TO ALBERT MORICE MILLER, OF VANCOUVER, BRITISH COLUMBIA, CANADA.

FISHING-HOOK.

1,158,666.  Specification of Letters Patent.  Patented Nov. 2, 1915.

Application filed November 23, 1914. Serial No. 873,512.

*To all whom it may concern:*

Be it known that I, JOHN SPENCER EVANS, a citizen of the United States, and a resident of the city of Vancouver, in the Province of British Columbia, Canada, have invented certain new and useful Improvements in Fishing-Hooks, of which the following is a specification.

My invention relates to improvements in fishing hooks, with more particular reference to those used for trolling, and the object of my invention is to devise a simple practical means the use of which will insure that when the fish seizes the bait hook it will also be automatically hooked on both sides, thereby obviating the chance of losing the fish on account of its being insecurely hooked, a frequent occurrence at the present time with the forms of hooks in common use. I attain this object by the means illustrated in the accompanying drawings in which—

Figure 1 is an assembled view of my hook. Fig. 2 is an enlarged sectional view on the line A—A in Fig. 1. Fig. 3 is an enlarged sectional view on the line B—B in Fig. 1. Fig. 4 is an enlarged sectional view on the line C—C in Fig. 1.

Similar figures of reference indicate similar parts throughout the several views.

1 is a plate of any suitable metal, which may be properly nickel or copper plated.

2 is an ordinary hook, secured to the lower end of the plate 1 in any suitable manner, which hook is intended to be seized by the fish when attracted by the plate 1 or by bait placed on the hook.

3 and 4 are hooks, formed preferably as shown in Fig. 1, and disposed one on each side of the plate 1 and connected thereto in swivel fashion by means of their respective clips 5 and 6, the countersink head screws 7 and 8, and the nuts 9 and 10, all as shown in Figs. 1 and 4. These hooks 3 and 4 are rigidly secured to their respective clips 5 and 6 so that they will not turn or slip under strain. The screws 7 and 8 are formed with a shoulder, as shown in Fig. 4, to prevent too tight connection of the clips 5 and 6 to the plate 1 and so that the clips may swivel freely between the plate and their respective nuts 9 and 10.

11 and 12 are spring catches, preferably of spring steel, slidably secured to the plate 1 by means of a rivet 13 passing through both catches and the slot 14 in the plate, the catches being held apart the proper distance for slidable engagement on the plate by means of the distance piece 15, through which the rivet 13 passes, as shown more particularly in Fig. 3. These spring catches are provided for the purpose of releasably holding the hooks 3 and 4 in their ineffective positions, as shown in full in Fig. 1; they are, however, so adjusted that they will readily permit the disengagement of the hooks therefrom when an ordinary strain comes on them. The slot 14 is provided in order that the catches 11 and 12 may be moved upwardly or downwardly on the plate 1 so that the strain required to operate the hooks will be more or less, as the case may be.

16 and 17 are wires of great toughness which connect the inner ends of the hooks 3 and 4 respectively to an ordinary swivel attachment 18, to which swivel is secured the trolling line 19. 20 and 21 are eyes formed one on each side of the plate 1 at the upper end thereof, through which pass, respectively, the wires 16 and 17, as shown in Figs. 1 and 2.

The manner in which my device operates is as follows:—When the fish seizes the hook 2 on the lower end of the plate 1 the strain on the trolling line immediately comes on the wires 16 and 17, which pull the hooks 3 and 4 out of the spring catches 11 and 12, causing them to swivel on the screws 7 and 8 into the position shown dotted in Fig. 1, thus gripping the fish on both sides, so that it will be securely held by both hooks 3 and 4 in addition to being hooked by the hook 2. It will be seen, therefore, that, although the grip taken by the fish of hook 2 may not be a very secure one, the strain on the line set up thereby will be sufficient to cause the hooks 3 and 4 to operate, and the fish, which would otherwise have been lost, will be securely held independently of the hook 2 should same have failed to hook the fish properly.

What I claim as my invention is:

1. A fishing hook of the character described, comprising a plate, a pair of hooks pivotally mounted on said plate on opposite sides thereof and arranged to swing upwardly to a normally vertical position, means for releasably holding the said hooks in their normal position, and means for connecting the said hooks to a trolling line so that a pull on the line will free the hooks from the releasable holding means and cause them to swing downwardly and inwardly.

2. A fishing hook of the character described, comprising a plate, a hook secured to the lower end of said plate, a pair of hooks pivotally mounted on said plate on opposite sides thereof and arranged to swing upwardly to a normally vertical position and reverse from each other, means for releasably holding the said hooks in their normal position, and means for connecting said hooks to a trolling line so that a pull thereon will free the hooks from the releasable holding means and swing them downwardly and inwardly to bring their points adjacent the first mentioned hook.

3. A fishing hook of the character described, comprising a plate, a hook secured to the lower end of said plate, a pair of hooks detachably connected to said plate on opposite sides thereof, said hooks being pivotally mounted so as to swing upwardly to a normally vertical position, spring catch members slidably mounted on said plate and adapted to releasably hold the said hooks in their normal positions, and a flexible connection secured to the plain end of each pivotally mounted hook, said connection being adapted for attachment to a trolling line so that a pull thereon will be transmitted to the flexible connection to free the hooks from the said spring catches and swing said hooks downwardly and inwardly to bring their points adjacent the first mentioned hook.

4. A fishing hook of the character described, comprising a plate having a longitudinal slot in its upper portion and oppositely disposed eyes on each side at its upper end, a hook secured to the lower end of the said plate, a pair of hooks detachably connected to the said plate on opposite sides thereof, said hooks being pivotally mounted so as to swing upwardly to a vertical position and downwardly so as to bring their points adjacent the first mentioned hook, a spring member on each side of said plate, a pin extending through the said members and said slot whereby the said members are held in slidable engagement on said plate, said members being adapted to releasably hold the said hooks in their upmost position, and a flexible connection for each pivotally mounted hook, each said flexible connection being secured to the plain end of its respective hook and passed through one of the said eyes and having its free end adapted for attachment to a trolling line.

5. The combination with a fish hook, a plate bait attached thereto, of a barbed member pivotally connected intermediate of its length to the plate and a line connected to the barbed member adapted to swing the barbed end thereof toward the hook when the pull is exerted on the hook.

Dated at Vancouver, B. C., this 7th day of November, 1914.

JOHN SPENCER EVANS.

Witnesses:
JAMES TAYLOR,
HERBERT DEAN.

Copies of this patent may be obtained for five cents each, by addressing the "Commissioner of Patents, Washington, D. C."